Jan. 12, 1971  S. L. PARKER  3,554,576

VEHICLE UNDERCARRIAGE

Filed Feb. 18, 1968  2 Sheets-Sheet 1

INVENTOR.
SHIRLEY L. PARKER
BY Hobbs & Green
ATTORNEYS

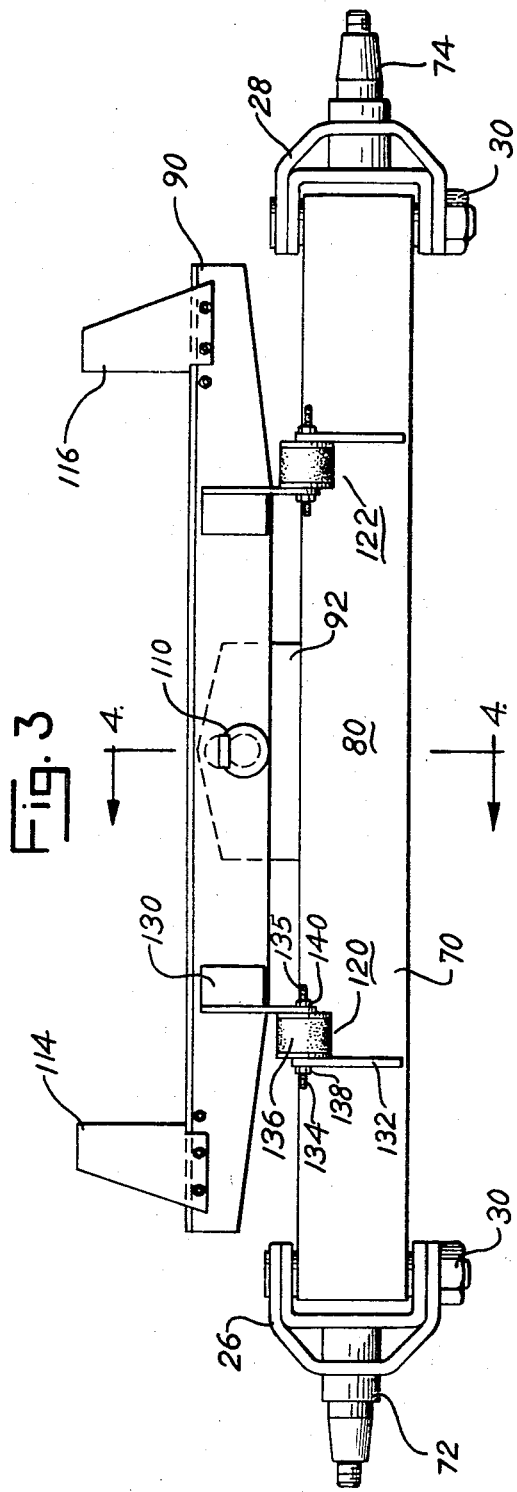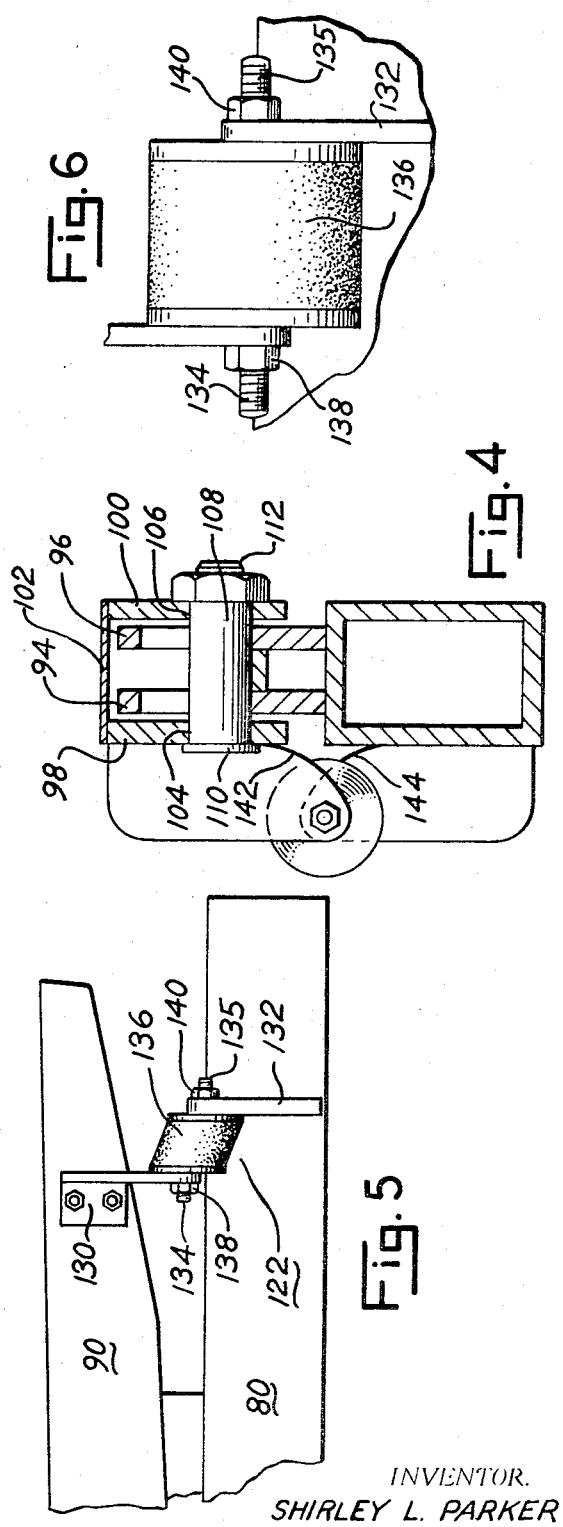

United States Patent Office 3,554,576
Patented Jan. 12, 1971

3,554,576
VEHICLE UNDERCARRIAGE
Shirley L. Parker, Warsaw, Ind., assignor to Parker Industries, Inc., Silverlake, Ind., a corporation of Indiana
Filed Feb. 18, 1969, Ser. No. 800,060
Int. Cl. B60g 9/02
U.S. Cl. 280—112  10 Claims

ABSTRACT OF THE DISCLOSURE

A front axle assembly for a wagon type vehicle in which the front axle is pivotably connected at its center to a bolster and a stabilizing device interconnects the axle and bolster on the lateral sides of the interconnecting pivot. The stabilizing means includes a downwardly extending part on the fixture of the bolster and an upwardly extending part on the fixture on the axle and a resilient element of elastomeric material is disposed between and connected to the two parts.

---

A conventional type of vehicle extensively used on farms and in related industry consists of an undercarriage with four wheels and a bottom discharge or gravity bed normally removably mounted on the undercarriage. The vehicle is adapted to be pulled by a tractor or truck and is used both in the field and on the highway. The undercarriage of standard construction is simply a frame having front and rear axles on which the bed rests, interconnected by members to form a substantially rigid unit. The front wheels are mounted on the front axle by pivoted axle members at each end which are controlled by a tongue or tow bar connected to the tractive vehicle. In normal use, the vehicle often encounters depressions, such as ditches, pot holes, ruts, bumps and other protruding obstacles; however, the frame of conventional rigid construction can not adapt itself to the foregoing irregularities and hence one wheel may be suspended momentarily off the ground, thus placing appreciable strain on the frame and/or on the bed. It is therefore one of the principal objects of the present invention to provide an undercarriage for a gravity bed type of vehicle which is so constructed and arranged that all four wheels will support the load regardless of normal irregulaities of the gound or road traversed by the vehicle and which will maintain effective load stability under the various ground or road conditions.

Another object of the invention is to provide an undercarriage for a vehicle of the aforesaid type which has a horizontally pivoted front axle and a stabilizing device which permits the front wheels to drop into a hole or yield to bumps or other road or ground roughness without causing instability of the load on the vehicle.

Still another object of the invention is to provide stabilizing means for use with a rocking bolster mounting for a wagon or similar vehicle having a gravity bed of a substantial height above the undercarriage, which resists the effect of centrifugal force of the vehicle and minimizes the effect of unbalanced loads and the tendency of the vehicle to lean and the load to become overbalanced on turning, and which performs a shock absorber function while the vehicle is traversing rough and irregular ground and road conditions.

A further object of the invention is to provide a relatively simple and dependable load stabilizing device for vehicles of the aforesaid type which can easily be installed on various vehicles of this type and which performs satisfactorily over a wide range of load and operating conditions.

Additional objects and advantages of the present invention will become apparent from the following description and accompanying drawings, wherein:

FIG. 3 is an enlarged front elevational view of the front axle of the vehicle assembly shown in FIG. 1;

FIG. 4 is a vertical cross sectional view through the front axle assembly shown in the preceding figures, the section being taken on line 4—4 of FIG. 3;

FIG. 5 is a fragmentary front elevational view of the axle assembly shown in FIG. 3 illustrating an operation performed by the structure; and FIG. 6 is a front elevational view of a stabilizing device.

Figure 1:
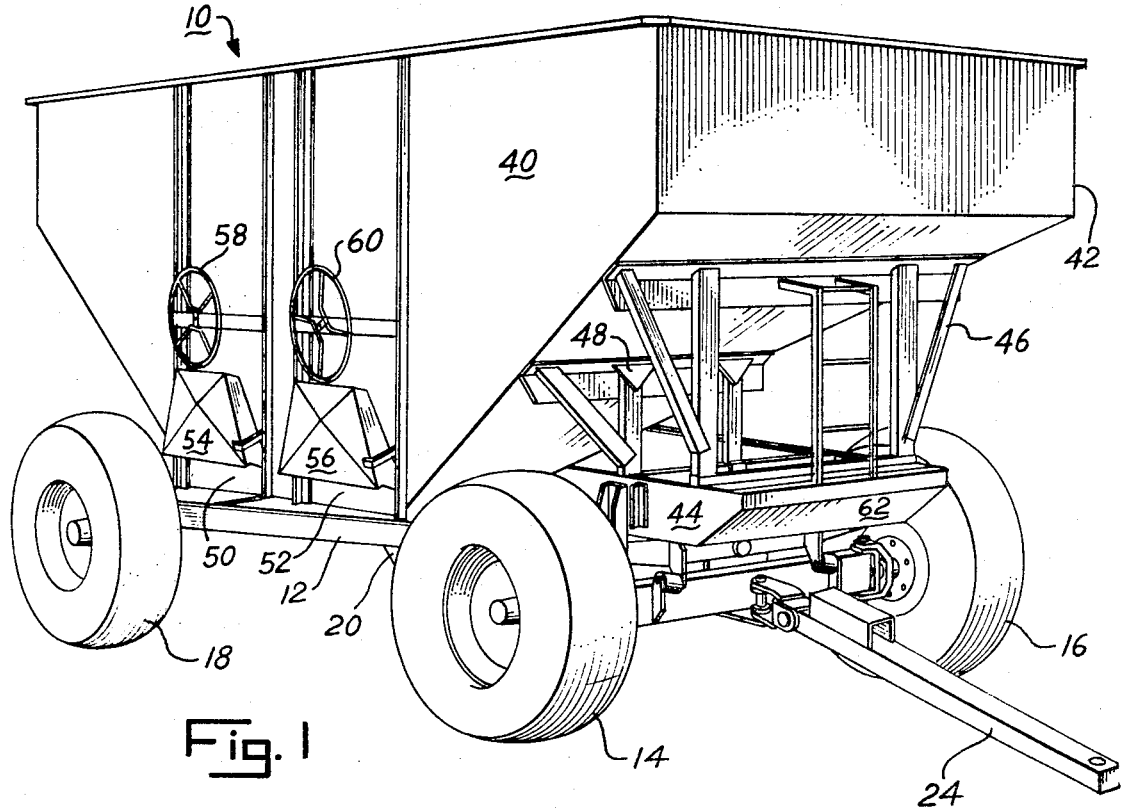
FIG. 1 is a perspective view of a farm vehicle having a gravity bed thereon.
Figure 2:
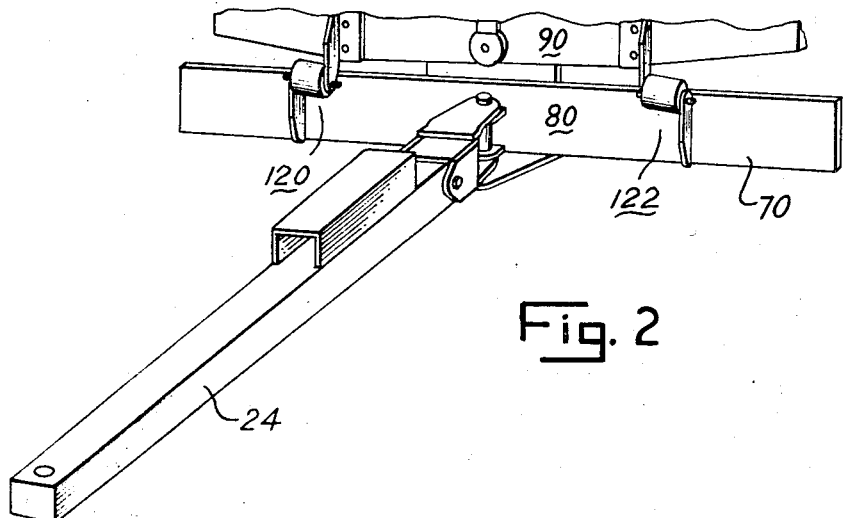
FIG. 2 is a perspective view of the front axle assembly and draw bar or tongue connected thereto.

Referring more specifically to the drawings and to FIG. 1 in particular, numeral 10 designates generally a farm vehicle consisting broadly of an undercarriage 12 with two front wheels 14 and 16 and two rear wheels 18 and 20. The four wheels are illustrated as having rubber tires, the front whels being steered by a draw bar 24 through a mechanism behind the axle assembly and secured to axle mounting fixtures 26 and 28 for wheels 14 and 16, respectively, the two fixtures being secured to the axle assembly by bolts 30. The wheels, rear axle and frame members connecting the axle assemblies are considered, for the purpose of the present description, as conventional in construction and operation and hence will not be described in detail herein. The gravity bed 40 is mounted on undercarriage 12 and generally consists of a container portion 42 mounted on a frame structure 44, and supported on the frame structure by support members generally indicated by numerals 46 and 48. The side seen in FIG. 1 contains two dischage openings 50 and 52 closed by doors 54 and 56, respectively, the two doors being operated by hand wheels 58 and 60 mounted on the side of the bed. The bottom of the bed slopes downwardly and inwardly from the two ends and downwardly from the side opposite the one shown in the drawings to the bottom of openings 50 and 52. Various types of gravity beds may be used on the undercarriage, the one shown having frame 44 with two laterally spaced side beams connected to one another by a front cross beam 62 and a similar rear cross beam (not shown). The frame 44, together with two side beams and the two front and rear cross beams and support members 46 and 48, forms a rigid structure with the container portion 42, which is supported on the undercarriage by the two lateral beams of frame 44 and which can be mounted on and removed from the undercarriage as a unit.

The present invention is primarily concerned with the front axle assembly consisting of axle 70 having mounted on the end thereof fixtures 26 and 28 which support the two axle shafts 72 and 74, respectively. The wheels are held on the axle shafts by nuts threaded into the two outer ends of the shaft. The two fixtures are free to pivot in an arc at the end of the main axle body and are steered by a mechanism (not shown) controlled by draw bar 24. The axle body 80 may be of any suitable construction such as rectangular tubular material, such as that shown in the drawings; however, other axle shapes may be used, if desired. Mounted on the upper side of axle body 80 is a bolster 90 pivotedly connected to axle body 80 by a fixture 92 consisting of two upstanding flange members 94 and 96 extending into the space formed by side members 98 and 100 of the bolster. The two side members 80 and 100 are rigidly joined together by a top panel 102 which is welded or otherwise rigidly secured to the upper edge of members 98 and 100. Side members 98 and 100 are provided with aligned holes 106 for receiving a pin 108 which has a head 110 at one end and a nut 112 on the other end threadedly received on the end of the pin.

The axle 70 is adapted to pivot vertically with respect to the bolster on pin 108, thereby permitting the front wheels to adapt themselves to irregularities such as holes and bumps in the ground or road. The holes through side members 98 and 100 are substantially the same size as the bolt 108; however, the holes through members 94 and 96 are elongated vertically to permit axle 70 to rock freely as well as adjust readily to relatively large irregularities in the ground or road. Bolster 90 contains upstanding bed retainer members 114 and 116 joined rigidly to the bolster near the opposite ends thereof. In most vehicles, the frame 44 of bed 40 merely rests on the upper surface of the bolster and is retained in proper position by the two members 114 and 116.

One of the principal features of the present invention is the stabilizing devices 120 and 122 interconnecting axle 70 at bolster 90 on opposite sides of pivot 110. Each stabilizing device consists of an upper bracket 130 and a lower bracket 132 secured, respectively, to the front of bolster 90 and the front of the axle body 80. These two fixtures are secured rigidly to the respective members and are adapted to move therewith. The two members have forwardly projecting plate-like parts and an element 136 of elastomeric material, such as rubber, is interposed between members 130 and 132. This element has bolts or studs 134 and 135 secured to opposite ends thereof. The studs are rigidly secured to metal discs or plates which are, in turn, bonded to the ends of the rubber element. The studs do not interfere with the flexing of the rubber elements since in the construction illustrated they are merely attached to the ends of the elements and do not extend therethrough. The studs are held in place between the two members by nuts 138 and 140, threadedly received on studs 134 and 135. Rubber element 136 is held firmly between two forwardly extending plate-like members of fixtures 130 and 132 by the bolts; however, the rubber is sufficiently yieldable to permit the axle and bolster to pivot relative to one another to the fullest extent possible. However, the rubber element resists this movement and endeavors to return the axle and bolster to their parallel relationship illustrated in FIG. 3. The rubber element is preferably cylindrical in shape and may be made of natural rubber or any suitable synthetic material which has sufficient yieldability and adequate resilience to permit the axle to move angularly and yet to cause the axle to return to its original position. This resistance and yieldability of element 136 can be selected by selecting rubber of the required durometer rating.

In the embodiment illustrated in the drawings, fixture 130 is bolted to the bolster and fixture 132 is welded to the axle; however, either of these may be secured by any other suitable means. The manner in which the rubber element becomes distorted as the two fixtures are relatively displaced is illustrated in FIG. 5 in which the axle is shown at an angular position, other than parallel with respect to bolster 90. The adjacent inner edges 142 and 144 of fixtures 130 and 132, respectively, are curved outwardly to avoid any likelihood of interference with the movement of axle 80 or bolster 90.

In the operation of a vehicle having the present undercarriage construction, the operation of the vehicle on level ground and roads is essentially the same as the conventional vehicle of this type, although more stable than the conventional vehicle on turns and with unevenly balanced loads. In the event the vehicle traverse rough ground having bumps and holes, such as rocks and ditches, the front axle readily pivots on pin 110 to permit the front wheels to adjust to the irregularities. The front axle moves angularly on pivot pin 110 and the stabilizing devices 120 and 122 resist the movement and urge the axle back to its horizontal position while permitting the axle to move to its fullest extent in response to the irregularities. As the axle pivots angularly, the fixtures 130 and 132 on the right hand side, for example as viewed in FIG. 3, move toward one another, and the fixtures 130 and 132 on the left hand side move away from one another, thereby causing the rubber element in each case to be distorted substantially the same amount in the opposite direction. The resiliency or yieldability of the rubber element which is subjected to the shear forces in the respective fixtures urges the fixtures and hence the axle back to their original position. Both stabilizing devices operate simultaneously to perform this function so that the forces attempting to return the axle and bolster to their original parallel position are acting substantially equally on opposite sides of pivot pin 110. Unlike springs, the stabilizing devices are not resilient to the extent that a counter force of any substantial degree is created by the return of the axle to its horizontal position. Hence, bouncing and rocking resulting from the initial bump are minimized so that the load on the undercarriage remains relatively stable and in its upright and level position.

The two fixtures 130 and 132 may be identical in construction and can be secured to the axle and bolster by bolts which permit adjustment either vertically or horizontally with respect to the axle and bolster, or, one or both may be connected to the respective member by welding or other suitable securing means. It is seen that this installation permits the front wheels and front axle to conform to the irregularities of the ground or road without causing any substantial shifting of the weight or center of gravity of the load, and permits the wheels to traverse the irregular ground without placing a strain on the frame of the undercarriage or the frame and other structural members of the bed.

While only one embodiment of the present vehicle undercarriage has been described in detail herein, various changes and modifications may be made without departing from the scope of the invention.

I claim:

1. A front axle assembly for a wagon type vehicle having two rear wheels and two steerable front wheels, said assembly comprising a transversely disposed bolster, an axle supporting said bolster, mounting means pivotally connecting said bolster and axle near the center thereof, and a stabilizing device on each side of said pivot means interconnecting said bolster and axle, each of said devices having a fixture connected to said bolster with a downwardly extending part, a fixture connected to said axle with an upwardly extending part disposed in spaced relation to said first part and movable relative thereto, and a resilient element of elastomeric material disposed between and connected to said parts.

2. A front axle assembly for a wagon type vehicle as defined in claim 1 in which said parts of the fixtures are of a plate-like construction having a broad side thereof facing one another and said resilient element has opposite ends thereof secured to said parts with said facing sides.

3. A front axle assembly for a wagon type vehicle as defined in claim 1 in which a stud is secured to each end of said resilient element and extends through a hole in said respective part.

4. A front axle assembly for a wagon type vehicle as defined in claim 2 in which a stud is secured to each end of said resilient element and extends through a hole in said respective part.

5. A front axle assembly for a wagon type vehicle as defined in claim 1 in which said element consists of elastomeric material and is cylindrical in shape and contains a metal plate at each end, and securing means attached to said plates.

6. A front axle assembly for a wagon type vehicle as defined in claim 3 in which said element consists of elastomeric material and is cylindrical in shape and contains a metal plate at each end for supporting said studs.

7. A front axle assembly for a wagon type vehicle as defined in claim 5 in which said metal plates are disc-shaped and are bonded to the ends of said elastomeric material.

8. A stabilizing device for a front axle assembly of a wagon type vehicle having a bolster and an axle pivotally connected together near the center thereof, said device including a fixture for mounting on said bolster and having a downwardly extending part, a fixture for mounting on said axle and having an upwardly extending part disposed in spaced relation to said first part and movable relative thereto, and a resilient element of elastomeric material disposed between and connected to said parts.

9. A front axle assembly for a wagon type vehicle as defined in claim 8 in which a stud is secured to each end of said resilient element and extends through a hole in said respective part.

10. A front axle assembly for a wagon type vehicle as defined in claim 9 in which said element consists of elastomeric material and is cylindrical in shape and contains a metal plate at each end for supporting said studs.

References Cited

UNITED STATES PATENTS

| | | | |
|---|---|---|---|
| 1,120,036 | 12/1914 | Dearing | 280—112 |
| 1,164,925 | 12/1915 | Clapp | 280—112X |
| 1,911,465 | 5/1933 | Poor | 280—112UX |
| 2,043,725 | 6/1936 | Anderson | 267—63—UX |
| 2,180,917 | 11/1939 | Terrell | 280—112 |
| 2,605,098 | 7/1952 | Hendrickson | 267—63X |

FOREIGN PATENTS

| | | | |
|---|---|---|---|
| 661,060 | 11/1951 | Great Britain | 267—63 |

KENNETH H. BETTS, Primary Examiner

U.S. Cl. X.R.

267—63; 298—24